(12) United States Patent
Kuramori et al.

(10) Patent No.: US 7,201,197 B2
(45) Date of Patent: Apr. 10, 2007

(54) TIRE/WHEEL ASSEMBLY

(75) Inventors: Akira Kuramori, Hiratsuka (JP);
Atsushi Tanno, Hiratsuka (JP);
Masatoshi Kuwajima, Hiratsuka (JP);
Mitsuo Ikeda, Hiratsuka (JP); Tsuyoshi Uehara, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 10/509,229

(22) PCT Filed: Jul. 23, 2003

(86) PCT No.: PCT/JP03/09320

§ 371 (c)(1),
(2), (4) Date: Sep. 24, 2004

(87) PCT Pub. No.: WO2004/009381

PCT Pub. Date: Jan. 29, 2004

(65) Prior Publication Data

US 2005/0121127 A1   Jun. 9, 2005

(30) Foreign Application Priority Data

Jul. 24, 2002 (JP) .............................. 2002-215419
Jul. 25, 2002 (JP) .............................. 2002-216916

(51) Int. Cl.
*B60C 17/04* (2006.01)
*B60C 5/16* (2006.01)
*B60C 15/02* (2006.01)

(52) U.S. Cl. .................... 152/520; 152/400; 152/381.5

(58) Field of Classification Search ................ 152/516, 152/520, 399–401, 381.5
See application file for complete search history.

(56) References Cited

U.S. PATENT DOCUMENTS 4,674,549 A * 6/1987 Bush .......................... 152/158

(Continued)

FOREIGN PATENT DOCUMENTS

JP           05-104915 A1    4/1993

(Continued)

OTHER PUBLICATIONS

International Search Report for PCT/JP03/09320 mailed on Nov. 11, 2003.

*Primary Examiner*—Jason R. Bellinger
(74) *Attorney, Agent, or Firm*—Greer, Burns & Crain, Ltd.

(57) ABSTRACT

A tire/wheel assembly includes a wheel having a rim, a pneumatic tire fitted to the rim of the wheel and a run-flat support member, the pneumatic tire having a tread surface and a hollow space, the tread surface having circumferential grooves extending in a circumferential direction of the tire, the run-flat support member being disposed in the hollow space of the pneumatic tire and having an annular shell and elastic rings, the annular shell comprising a support surface formed radially outward having a convexly curved surface portion with an annular apical line or face and two leg portions formed radially inward, the elastic rings supporting the two leg portions on the rim. The apical line or apical face of the convexly curved surface portion is offset in a direction of a center axis of rotation of the wheel so as not to be located in a position corresponding to the circumferential grooves when viewed from a radial direction of the wheel.

7 Claims, 3 Drawing Sheets

U.S. PATENT DOCUMENTS 5,685,927 A * 11/1997 Hammond et al. .... 152/209.26
5,957,179 A * 9/1999 Graas .................... 152/209.14
6,305,450 B1 * 10/2001 Guermandi .............. 152/154.2
6,463,974 B1 10/2002 Hellweg et al.
6,463,976 B1 10/2002 Glinz et al.

FOREIGN PATENT DOCUMENTS

| JP | 07-032827 A1 | 2/1995 |
| JP | 10-297226 A1 | 11/1998 |
| JP | 2001-519279 A1 | 10/2001 |
| WO | WO-99/64260 A1 | 12/1999 |

* cited by examiner

TIRE/WHEEL ASSEMBLY

TECHNICAL FIELD

The present invention relates to a tire/wheel assembly, and, more particularly, to a tire/wheel assembly which can improve durability thereof.

TECHNICAL BACKGROUND

In response to demands in the market, there have been proposed many technologies which allow a vehicle to urgently travel several hundred kilometers even when a pneumatic tire is punctured while running. Among these many proposals, those disclosed in Japanese Patent Laid-Open Publication No. 10-297226 and Published Japanese Translation of a PCT Application No. 2001-519279 have enabled run-flat traveling by supporting a punctured tire by a support member which is fitted onto a rim in a hollow space of the pneumatic tire assembled to the rim.

The above run-flat support member comprises an annular shell having an support surface formed radially outward in the form of a convexly curved surface and two leg portions located radialy inward, and elastic rings attached to the two leg portions, and is supported on the rim via the elastic rings. The run-flat support member allows existing wheels and rims to be used without any specific modification, and, therefore, can be advantageously adopted without causing confusions in the market.

There are also known tire/wheel assemblies that allow run-flat traveling by supporting the inner surface of a punctured tire by the radially outer support surface of an annular run-flat insert member, formed from a rigid material such as metal or resin in such a shape as a "T" or "I" shape, which is fitted onto a rim in a hollow space of the pneumatic tire assembled to the rim.

However, when a run-fat traveling distance up to the destruction of a tire is examined on tire/wheel assemblies to which the above-mentioned run-flat support member or run-flat insert member is attached using pneumatic tires with different tread patterns, the run-flat traveling distance varies significantly according to the tread patterns. In particular, when pneumatic tires having circumferential grooves extending in a tread surface in a circumferential direction of the tire are used for tire/wheel assemblies, the run-flat traveling distance tends to be shorter, and there is a problem that durability thereof is lowered.

DISCLOSURE OF THE INVENTION

An object of the present invention is to provide a tire/wheel assembly in which when a pneumatic tire having a circumferential groove extending in a tread surface in a circumferential direction of the tire is used, durability can be improved.

In order to achieve the above object, a tire/wheel assembly according to the present invention comprises a wheel having a rim, a pneumatic tire fitted to the rim of the wheel and a run-flat support member, the pneumatic tire having a tread surface and a hollow space, the tread surface having a circumferential groove extending in a circumferential direction of the tire, the run-flat support member being disposed in the hollow space of the pneumatic tire and having an annular shell and elastic rings, the annular shell comprising a support surface formed radially outward having a convexly curved surface portion with an annular apical line or face and two leg portions formed radially inward, the elastic rings supporting the two leg portions on the rim, wherein the apical line or apical face of the convexly curved surface portion is offset in a direction of a center axis of rotation of the wheel so as not to be located in a position corresponding to the circumferential groove when viewed from a radial direction of the wheel.

Another tire/wheel assembly according to the present invention comprises a wheel having a rim, a pneumatic tire fitted to the rim of the wheel and a run-flat insert member, the pneumatic tire having a tread surface and a hollow space, the tread surface having a circumferential groove extending in a circumferential direction of the tire, the run-flat insert member being disposed in the hollow space of the pneumatic tire and having an annular support surface with two edges disposed radially outward for supporting an inner surface of the pneumatic tire during run-flat traveling, wherein the two edges of the annular support surface are offset in a direction of a center axis of rotation of the wheel so as not to be located in a position corresponding to the circumferential groove when viewed from a radial direction of the wheel.

According to the present invention mentioned above, during run-flat traveling, the run-flat support member supports the inner surface of the pneumatic tire with the apical line or apical face of the convexly curved surface portion of the support surface thereof being not engaged with a thin portion of the tread portion in which a circumferential groove exists, but being engaged with a thick portion thereof, or the run-flat insert member supports the inner surface of the pneumatic tire with the two edges of the support surface thereof being not engaged with a thin portion of the tread portion in which a circumferential groove exists, but being engaged with a thick portion thereof, thereby allowing durability to be improved because of suppressing the occurrence of the destruction at the circumferential groove.

BEST MODES FOR CARRYING OUT THE INVENTION

The embodiments of the present invention will be described in detail below with reference to the drawings.

Figure 1:
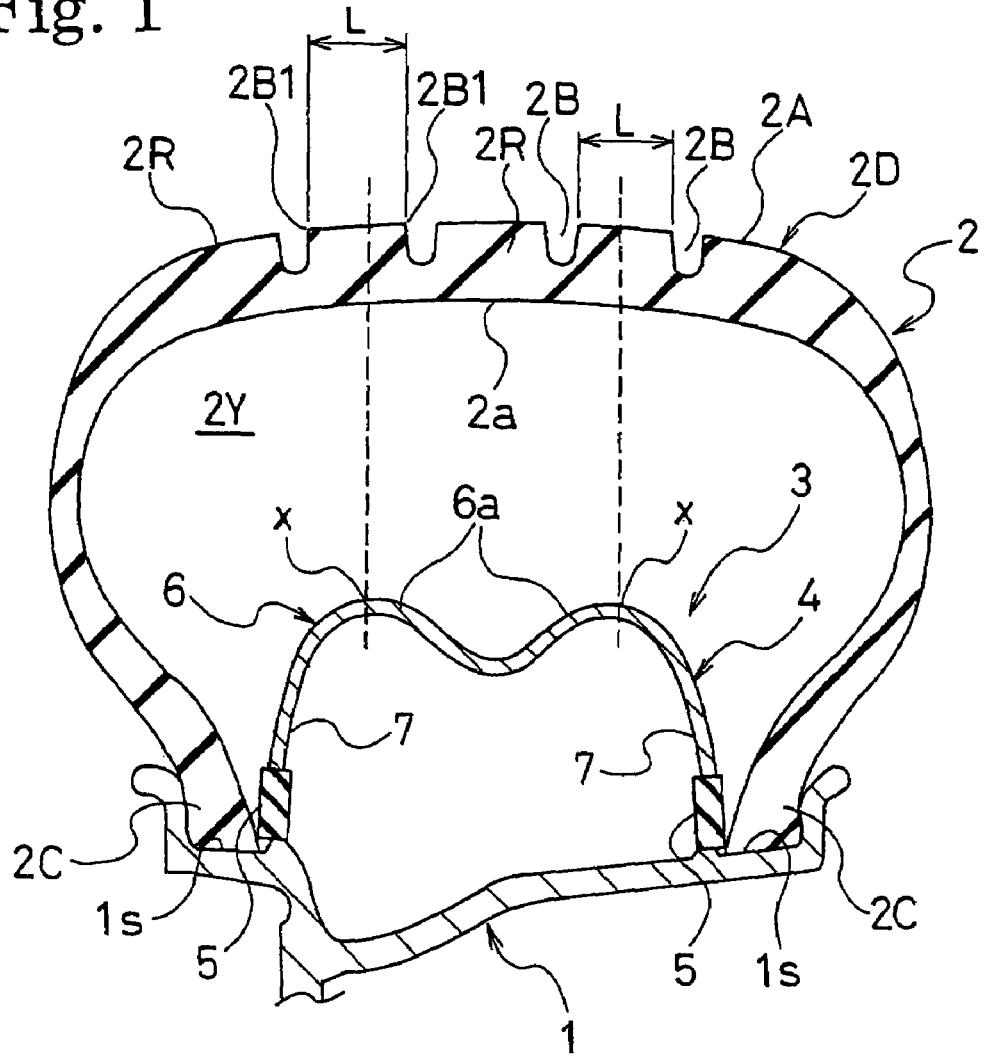
FIG. 1 is a cross-sectional view showing a main part of an embodiment of a tire/wheel assembly according to the present invention.

FIG. 1 is a cross-sectional view illustrating a main part of an embodiment of a tire/wheel assembly according to the present invention, in which reference numeral 1 denotes a rim in the outer periphery of a wheel, reference numeral 2 denotes a pneumatic tire, and reference numeral 3 denotes a run-flat support member.

The pneumatic tire 2 includes a tread surface 2A having a plurality of circumferential grooves 2B extending straight along a circumferential direction of the tire, which define ribs 2R therebetween. The rim 1, pneumatic tire 2, and run-flat support member 3 are formed in an annular shape coaxially about a center axis of rotation of the wheel (not shown), and the run-flat support member 3 is placed in a hollow space 2Y of the pneumatic tire 2 mounted on the rim 1.

The run-flat support member 3 comprises an annular shell 4 formed from an annulus of a rigid material such as metal or resin in order to support the weight of a vehicle via a punctured tire, and right and left elastic rings 5 formed of an elastic material such as rubber or elastic resin in order to stably support the annular shell 4 with respect to the rim 1.

The metal used for the annular shell 4 may include, for example, steel, aluminum and the like. The resin may be either of thermoplastic resin or thermosetting resin. The thermoplastic resin may include nylon, polyester and the like, and the thermosetting resin may be epoxy resin, unsaturated polyester resin, etc. The resin may be used alone or may be employed as fiber-reinforced resin blended with reinforcing fibers.

The elastic rings 5 may be formed of any kind of rubber or resin as long as the annular shell 4 can be stably supported. The rubber may include, for example, natural rubber, isoprene rubber, styrene-butadiene rubber, butadiene rubber, butyl rubber, etc. The elastic resin may be foamed resin such as foamed polyurethane.

The annular shell 4 is formed so that it has an outer diameter smaller than the inner diameter of an inner surface 2a of the pneumatic tire 2 in order to maintain a constant distance therebetween, and includes an annular support surface 6 having two convexly curved surface portions 6a, each being radially outwardly convex in shape when viewed in the cross section orthogonal to the tire circumferential direction. The convexly curved surface portions 6a have a predetermined curvature radius and are arranged along a width direction of the shell. The support surface 6 is spaced apart from the inner surface 2a of the pneumatic tire 2 when the pneumatic tire 2 is under a normal condition, and when the pneumatic tire 2 is punctured, the support surface 6 supports the inner surface 2a of the flattened tire.

The annular shell 4 has two side walls radially inward which are formed as leg portions 7, and each elastic ring 5 is attached to the radially inner side of each leg portion. The elastic rings 5 are fittingly engaged with right and left rim seats 1s to support the annular shell 4, thereby not only mitigating vibrations of and impacts upon the annular shell 4 from a punctured tire, but also preventing slipping relative to the rim seats 1s. The elastic rings stably support the annular shell 4. The elastic rings 5 are formed so that the inner diameter thereof is in the approximately same size as the inner diameter of the beads of the pneumatic tire 2.

The above-mentioned convexly curved surface portions 6a each have an apical line x which connects apexes thereof, the apical line x being located between the circumferential grooves 2B and being offset towards a direction of the wheel rotation center axis (the left or right direction in the drawing) so that the apical line x is not identical to the circumferential groove 2B when viewed from the radial direction of the wheel.

The run-flat support member 3, when assembled to a rim, is inserted into the interior of the pneumatic tire 2, and the elastic rings 5 are fitted to the rim seats 1s of the rim 1 together with the beads 2C of the pneumatic tire 2 simultaneously.

In tire/wheel assemblies which employed a pneumatic tire having a tread surface with circumferential grooves extending along a circumferential direction of the tire, the inventors made an observation of pneumatic tires which busted up during run-flat traveling, resulting in that the destruction of each tire occurred along the circumferential grooves, which made the run-flat traveling impossible.

When the relation between the circumferential grooves and each run-flat support member was studied, it was realized that, in the case where, when viewed in the radial direction of the wheel, the apical line of the convexly curved surface portion which supported the tire was identical to a circumferential groove where the thickness of the tread was the thinnest, tire destruction occurred earlier and the run-flat traveling distance was shorter because the run-flat support member supported the tire at the thinnest portion of the tread.

The present invention is based on the discovery of this fact, and the apical lines x of the convexly curved surface portions 6a are offset in a direction of the wheel rotation center axis so that the apical lines x of the convexly curved surface portions 6a are not identical to the circumferential grooves 2B when viewed from the radial direction of the wheel. This allows the apical lines x of the convexly curved surface portions 6a to engage with the portions (thick portions) of ribs 2R of the tread 2D and the run-flat support member 3 to support the inner surface 2a of the pneumatic tire 2 at the thick portions of the tread 2D during run-flat traveling, thereby suppressing the destruction at the circumferential grooves 2B. Therefore, durability can be improved.

It is preferable in view of more effective improvement of durability that the apical line x of each convexly curved surface portion 6a be positioned so as to be spaced away one forth or more of a wheel rotation axis direction length L (rib width) between the opening ends 2B1 of circumferential grooves 2B from each opening end 2B1 thereof. It is more preferable that the apical line x of each convexly curved surface portion 6a be located substantially in the center between the opening ends 2B1 (the center of the rib 2R).

The position of the apical line x is determined in the state of the tire being filled with air before punctured, since the tire reduces its diameter almost without changing the position of the circumferential grooves 2B in the direction of the wheel rotation center axis when the tire is in the run-flat traveling state after punctured and deflated. The position of the apical line x, however, may be determined, based on the tire in the run-flat traveling condition.

Figure 2:
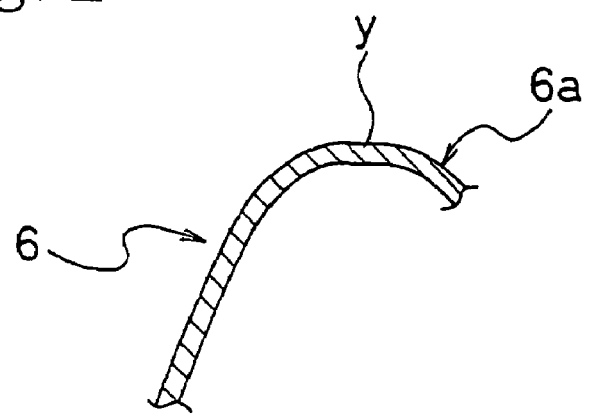
FIG. 2 is an enlarged cross-sectional view showing a main part of another run-flat support member used for a tire/wheel assembly according to the present invention.

The support surface 6 of the run-flat support member 3 may be one having convexly curved surface portions 6a with an annular apical face y which is flat in cross section, as shown in FIG. 2, instead of the convexly curved surface portions 6a with the apical line x as described above. In this case, the apical face y is arranged not to overlap relative to the circumferential groove 2B as mentioned above. Preferably, the apical face y may be spaced away from the circumferential groove 2B as described above.

Exemplified is the run-flat support member 3 having the annular shell 4 with the support surface 6 which comprises two convexly curved surface portions 6a. The number of the convexly curved surface portions is, however, not limited to two, but may be one or three or more. In this case also, the apical line x or apical face y of each convexly curved surface potion 6a is arranged to be offset relative to the circumferential groove 2B, thereby allowing durability to be improved.

Two or more convexly curved surface portions are preferably arranged. By forming the support surface 6 in this way so as to arrange two or more convexly curved surface portions 6a, the contact points of the support surface with the tire inner surface 2a are dispersed in two or more, and localized wear on the tire inner surface 2a is reduced, thereby making it possible to extend a distance that a vehicle can endure run-flat traveling.

Figure 3:
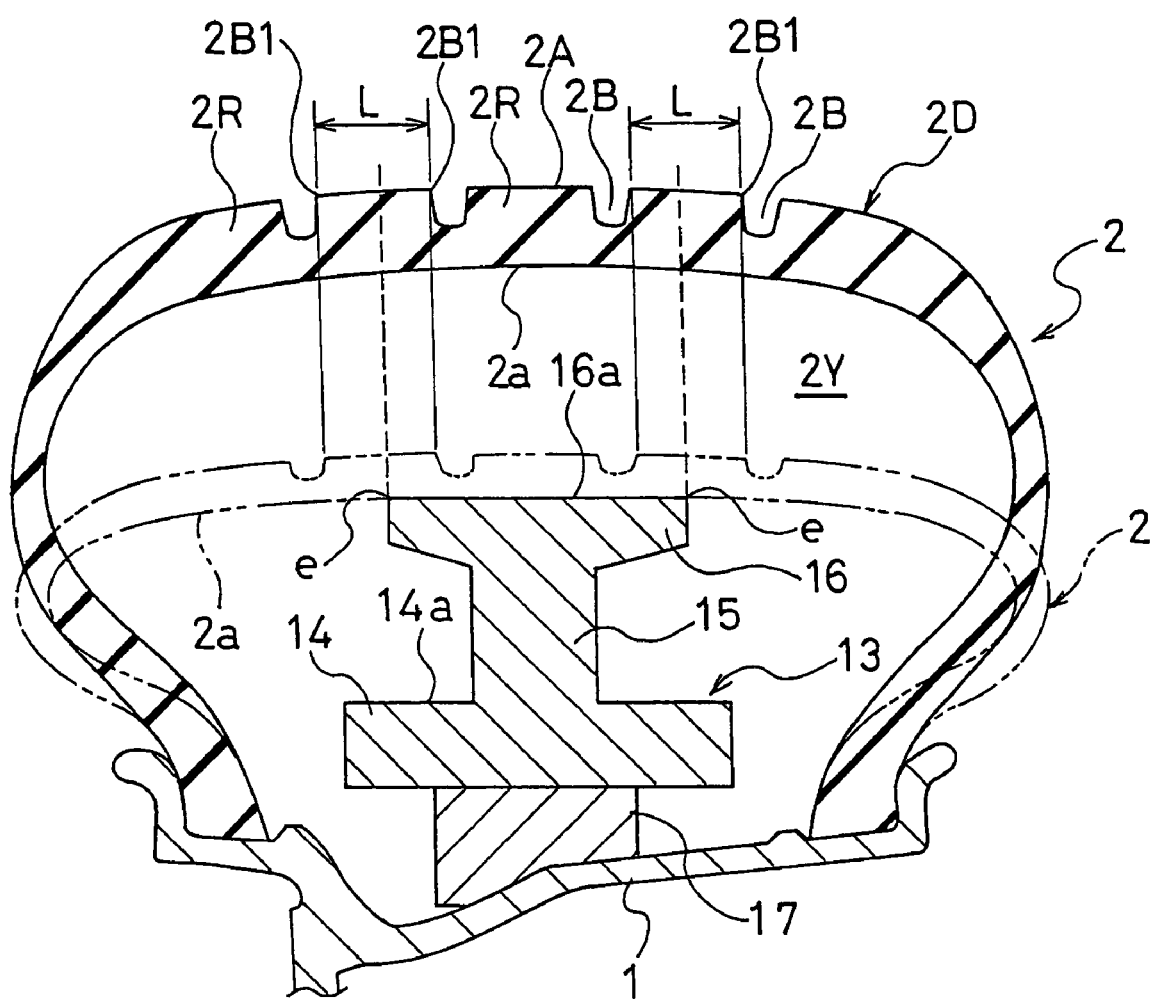
FIG. 3 is a cross-sectional view showing a main part of an alternative embodiment of a tire/wheel assembly according to the present invention.

FIG. 3 shows an alternative embodiment of a tire/wheel assembly according to the present invention, in which a run-flat insert member 13 is employed in the alternative of the above-mentioned run-flat support member 3.

The run-flat insert member 13 comprises an annulus which is I-shaped in cross section, having a cylindrical base portion 14, a ring portion 15 annularly protruding on the radially outer surface 14a of the base portion 14, and a support portion 16 annularly disposed on the outer circumference of the ring portion 15; the base portion 14, ring portion 15 and support portion 16 are formed as a unitary structure from a rigid material such as metal or resin.

The metal used for the run-flat insert member 13 may include, for example, steel, aluminum and the like. The resin may be either of thermoplastic resin or thermosetting resin. The thermoplastic resin may include nylon, polyester and the like, and the thermosetting resin may be epoxy resin, unsaturated polyester resin, etc. The resin may be used alone, or may be employed as fiber-reinforced resin blended with reinforcing fibers.

The radially outer surface of the support portion 16 is formed as a support surface 16a for supporting the inner surface 2a of the pneumatic tire 2 during run-flat traveling. The annular support surface 16a has the substantially same shape as the inner surface 2a of the pneumatic tire 2 which is supported during ran-flat traveling.

The support surface 16a has two edges e which are offset toward a direction of the wheel rotation center axis so that each edge e is not identical to the circumferential groove 2B when viewed from the radial direction of the wheel. The run-flat insert member 13 is secured to the rim 1 through an insert member supporting element 17.

The tire/wheel assembly using the run-flat insert member 13 as mentioned above can also improve durability, because the both edges e of the support surface 16a are in engagement with the portions (thick portions) of ribs 2R of the tread 2D during run-flat traveling and the destruction at the circumferential grooves 2B are suppressed.

Figure 4:
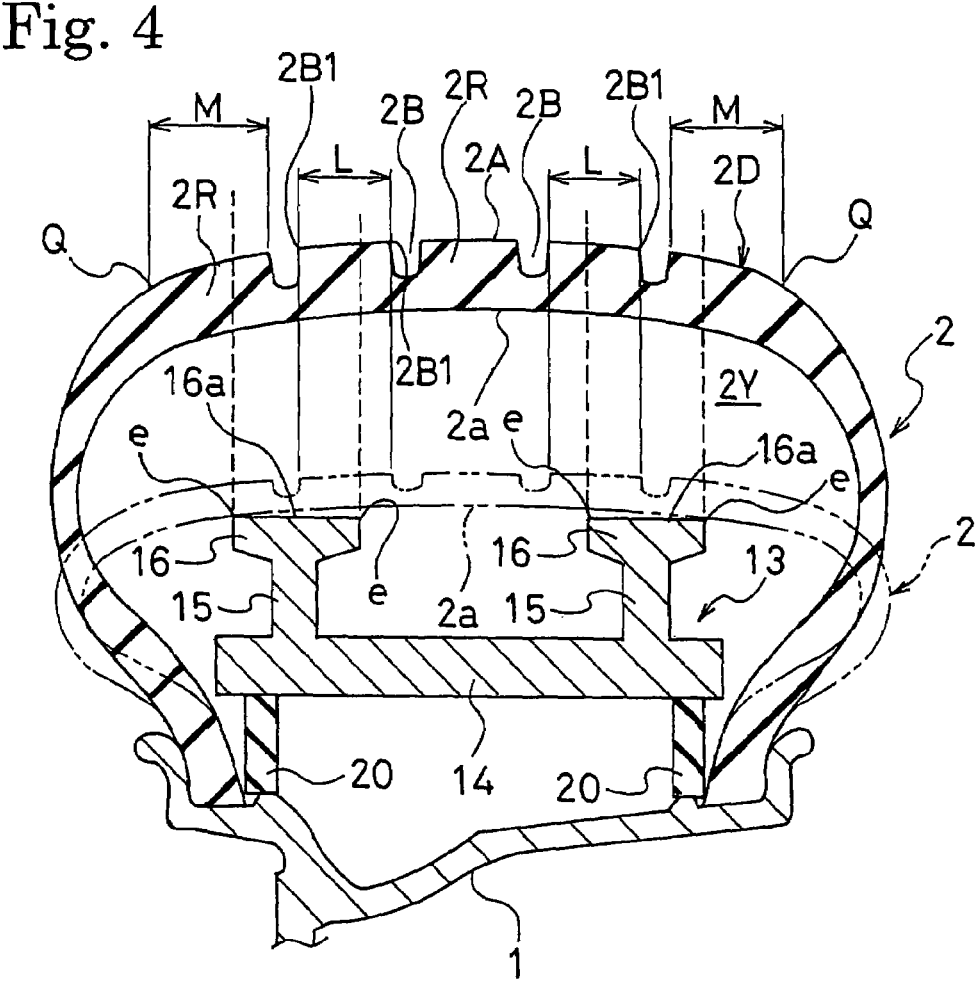
FIG. 4 is a cross-sectional view showing a main part of another alternative embodiment of a tire/wheel assembly according to the present invention.

FIG. 4 shows another alternative embodiment of a tire/wheel assembly according to the present invention, which has the same structure as the above-mentioned tire/wheel assembly in FIG. 3 except that the run-flat insert member has two support portions 16 for supporting the inner surface 2a of the pneumatic tire 2 during ran-flat traveling, each support portion 16 being disposed via a ring portion 15 on each side of the radially outer surface of the base portion 14. The run-flat insert member also has left and right elastic rings 20, which are formed of an elastic material such as rubber or elastic resin, protruding from the inner circumference of the base portion 14, the elastic rings 20 being fittingly attached to the rim 1 as insert member supporting elements. Each edge e of the support surfaces 16a is offset as described above, also when the run-flat insert member 13 having a plurality of such support portions 16 is employed, thus allowing the same effect to be obtained.

The foregoing run-flat insert member 13 is not limited to those which are fixedly attached to the rim 1 through the insert member supporting element 17 or the elastic rings 20, but is one which is directly fixedly attached to the rim 1 therewithout, or one which is mounted on a slide base attached to the rim 1; the run-flat insert member 13 may be any of run-flat insert members which include an annular support surface 16a with edges e on both sides thereof disposed radially outward for supporting the inner surface 2a of the pneumatic tire 2.

It is preferable in view of more effective improvement of durability that each edge e of the support surface 16a of the run-flat insert member 13 between the circumferential grooves 2B be positioned so as to be spaced away one forth or more of the wheel rotation axis direction length L between the opening ends 2B1 of circumferential grooves 2B from each opening end 2B1 thereof, as described above. It is more preferable that each edge e be located substantially in the center between the opening ends 2B1.

Each edge e of the support surfaces 16a positioned tire-outwardly of both outermost circumferential grooves 2B as shown in FIG. 4 may be located so as to be spaced apart one forth or more of a wheel rotation axis direction length M between the tire-outer opening end 2B1 of the outermost circumferential groove 2B and the contact end Q of the tread surface 2A from the opening end 2B1 towards the tire outer side. Preferably, each edge e may be positioned substantially in the center between the tire-outer opening end 2B1 of the outermost circumferential groove 2B and the contact end Q of the tread surface 2A.

Note that the contact end Q referred herein is the contact end of the tread surface 2A in which the tire/wheel assembly has an air pressure of 200 kPa and load of 80% of the maximum load ability described in JATMA (JATMA YEAR BOOK 2001) is applied thereto.

The position of each edge e is determined, as described above, in the state of the tire being filled with air before punctured, since the tire reduces its diameter almost without changing the position of the circumferential grooves 2B relative to the direction of the wheel rotation center axis when the tire is in the run-flat traveling state after punctured and deflated. The position of each edge e, however, may be determined, based on the tire in the run-flat traveling condition.

Figure 5:
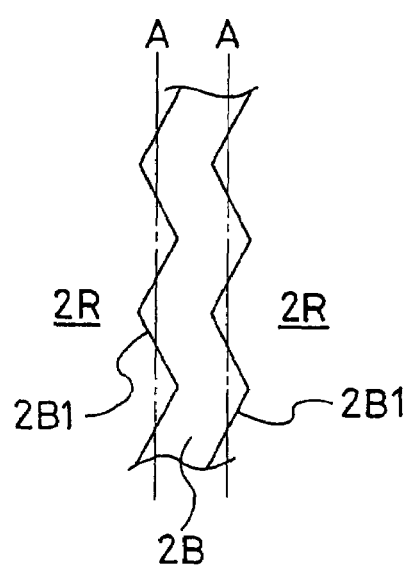
FIG. 5 is an explanatory view showing an another example of a circumferential groove of a pneumatic tire used for a tire/wheel assembly according to the present invention.

In the embodiments illustrated above, the circumferential grooves 2B, which are straight in shape, are exemplified, but as shown in FIG. 5, the circumferential grooves 2B may be zigzag grooves. In such a case also, the apical line x or apical face y of the support surface 6a and each edge e of the support surface 16a may be positioned so as to be spaced away from each opening end 2B1 one forth or more of the wheel rotation axis direction length L, M as discussed above. When the circumferential grooves 2B are zigzag in shape like this, the position of each opening end 2B1 is defined to be the center position A of the zigzag width of the opening end 2B1 extending in a zigzag path.

In the above-mentioned embodiments, exemplified are the pneumatic tires 2 which include a tread surface 2A having ribs 2R defined by the circumferential grooves 2B, but the pneumatic tire 2 may be one that has a block pattern with blocks defined by circumferential grooves and lateral grooves; in this case also, the same effect can be obtained by using the foregoing run-flat support members 3 or run-flat insert members 13.

EXAMPLE 1

Prepared were tire/wheel assemblies of the present invention (example A) and the comparison (comparative example A), having the same tire size of 205/55R16 and the same rim size of 16×6 1/2JJ, the tire/wheel assembly of the present invention having a construction in which a run-flat support member is arranged such that the apical line of each convexly curved surface portion thereof is positioned approximately in the center between the circumferential grooves, as shown in FIG. 1, and the comparative tire/wheel assembly having the same construction as the tire/wheel assemblies of the present invention except that the apical line of each convexly curved surface portion is located in a position corresponding to the circumferential groove.

An evaluation test for durability was conducted on each of the test tire/wheel assemblies in accordance with the following measurement method. The results shown in Table 1 were obtained.

Durability

Each of the test tire/wheel assemblies having an air pressure of 0 kPa was fitted as a front right wheel of a front-wheel-drive vehicle with a displacement of 2.5 liters and the vehicle was driven at 90 Km/h in a test course. A distance until the vehicle could no longer run was measured. The results of the measurement were evaluated by an index number, with the index number of the comparative tire/wheel assembly being 100. The greater the index number is, the better the durability.

The same sized tires and rims as described above were used for wheels of the vehicle other than the front right wheel, with the tires having an air pressure of 200 kPa.

TABLE 1

|  | Example A | Comparative Example A |
|---|---|---|
| Durability | 185 | 100 |

As can be seen from Table 1, the tire/wheel assembly of the present invention is capable of improving durability.

EXAMPLE 2

Prepared were tire/wheel assemblies of the present invention (example B) and the comparison (comparative example B), having the same tire size and the same rim size as in Example 1, the tire/wheel assembly of the present invention having a construction in which a run-flat insert member is arranged such that each edge of the support surface thereof is positioned approximately in the center between the circumferential grooves, as shown in FIG. 3, and the comparative tire/wheel assembly having the same construction as the tire/wheel assembly of the present invention except that each edge of the support surface is located in a position corresponding to the circumferential groove.

An evaluation test for durability was conducted on each of the test tire/wheel assemblies in accordance with the measurement method shown in Example 1. The results shown in Table 2 were obtained.

TABLE 2

|  | Example B | Comparative Example B |
|---|---|---|
| Durability | 175 | 100 |

As can be seen from Table 2, the tire/wheel assembly of the present invention is capable of improving durability.

As illustrated above, according to the present invention, the run-flat support member is arranged such that the apical line or apical face of each convexly curved surface portion of the support surface thereof is offset in a direction of the wheel rotation center axis so as not to be located in a position corresponding to the circumferential groove when viewed from the radial direction of the wheel, or the run-flat insert member is arranged such that each edge of the support surface thereof is offset in a direction of the wheel rotation center axis so as not to be located in a position corresponding to the circumferential groove when viewed from the radial direction of the wheel, thereby allowing durability of the tire/wheel assembly using a pneumatic tire having a tread surface with circumferential grooves extending in the circumferential direction of the tire to be improved.

INDUSTRIAL APPLICABILITY

The tire/wheel assembly of the present invention having the aforementioned excellent effect can be used very effectively as a tire/wheel assembly which is mounted to a vehicle and allows run-flat traveling.

What is claimed is:

1. A tire/wheel assembly comprising:
  a wheel having a rim;
  a pneumatic tire fitted to the rim of the wheel, the pneumatic tire having a tread surface and a hollow space, the tread surface having a circumferential groove extending in a circumferential direction of the tire; and
  a run-flat support member disposed in the hollow space of the pneumatic tire, the run-flat support member having an annular shell and elastic rings,
  the annular shell including a support surface formed on the radially outwardly facing surface and having a convexly curved surface portion with an annular apical line or face, and including two leg portions extending radially inwardly from the annular shell, the elastic rings supporting the two leg portions on the rim,
  wherein the apical line or apical face of the convexly curved surface portion is offset in a direction of a center axis of rotation of the wheel so as not to be located in a position corresponding to the circumferential groove when viewed from a radial direction of the wheel, and
  wherein the tread surface of the pneumatic tire has a plurality of circumferential grooves, the apical line or apical face of the convexly curved surface portion being located between one of the circumferential grooves and an adjacent one of the circumferential grooves so as to be spaced away one quarter or more of a wheel rotation axis direction length (L) between opening ends of the adjacent circumferential grooves from each circumferential groove opening end in the direction of the wheel rotation center axis.

2. A tire/wheel assembly according to claim 1, wherein the apical line or apical face of the convexly curved surface portion is approximately centrally positioned between the adjacent circumferential grooves.

3. A tire/wheel assembly comprising:
  a wheel having a rim;
  a pneumatic tire fitted to the rim of the wheel, the pneumatic tire having a tread surface and a hollow space, the tread surface having a circumferential groove extending in a circumferential direction of the tire; and
  a run-flat insert member disposed in the hollow space of the pneumatic tire, the run-flat insert member having an annular support surface with two edges provided on the radially outwardly facing surface of the run-flat insert member for supporting an inner surface of the pneumatic tire during run-flat traveling, wherein the two edges of the annular support surface are offset in a direction of a center axis of rotation of the wheel so as not to be located in a position corresponding to the circumferential groove when viewed from a radial direction of the wheel, and wherein the tread surface of the pneumatic tire has a plurality of circumferential grooves, each of the two edges of the support surface being located between one of the circumferential grooves and an adjacent one of the circumferential grooves so as to be spaced away one quarter or more of a wheel rotation axis direction length (L) between opening ends of the adjacent circumferential grooves from each circumferential groove opening end in the direction of the wheel rotation center axis.

4. A tire/wheel assembly according to claim 3, wherein each of the two edges of the support surface is approximately centrally positioned between the adjacent circumferential grooves.

5. A tire/wheel assembly according to claim 1, wherein the support surface includes two convexly curved surface portions each having an annular apical line or face, the apical line or face for each of the convexly curved surface portions being located between adjacent ones of the circumferential grooves so as to be spaced away one quarter or more of the wheel rotation axis direction length (L) from each circumferential groove opening end in the direction of the wheel rotation center axis.

6. A tire/wheel assembly according to claim 5, wherein the plurality of circumferential grooves comprise four circumferential grooves, the four circumferential grooves including two inner circumferential grooves and two outer circumferential grooves disposed outwardly from the two inner circumferential grooves, the apical line or face for each of the convexly curved surface portions being located between an inner circumferential groove and an outer circumferential groove adjacent the inner circumferential groove so as to be spaced away one quarter or more of a wheel rotation axis direction length (L) between opening ends of the adjacent inner and outer circumferential grooves from each circumferential groove opening end in the direction of the wheel rotation center axis.

7. A tire/wheel assembly according to claim 3, wherein the plurality of circumferential grooves comprise four circumferential grooves, the four circumferential grooves including two inner circumferential grooves and two outer circumferential grooves disposed outwardly from the two outer circumferential grooves, each of the two edges of the support surface being located between an inner circumferential groove and an outer circumferential groove adjacent to the inner circumferential groove so as to be spaced away one quarter or more of a wheel rotation axis direction length (L) between opening ends of the adjacent inner and outer circumferential grooves from each circumferential groove opening end in the direction of the wheel rotation center axis.

* * * * *